US008812487B2

(12) United States Patent
Krishnamurthy et al.

(10) Patent No.: US 8,812,487 B2
(45) Date of Patent: Aug. 19, 2014

(54) ADDITION AND PROCESSING OF CONTINUOUS SQL QUERIES IN A STREAMING RELATIONAL DATABASE MANAGEMENT SYSTEM

(75) Inventors: Saileshwar Krishnamurthy, Palo Alto, CA (US); Neil Thombre, Santa Clara, CA (US); Neil Conway, Berkeley, CA (US); Wing Hang Li, San Bruno, CA (US); Morten Hoyer, Montclair, NJ (US)

(73) Assignee: Cisco Technology, Inc., San Jose, CA (US)

( * ) Notice: Subject to any disclaimer, the term of this patent is extended or adjusted under 35 U.S.C. 154(b) by 306 days.

(21) Appl. No.: 12/398,944

(22) Filed: Mar. 5, 2009

(65) Prior Publication Data
US 2009/0228434 A1    Sep. 10, 2009

Related U.S. Application Data

(60) Provisional application No. 61/068,572, filed on Mar. 6, 2008.

(51) Int. Cl.
*G06F 7/00*  (2006.01)
*G06F 17/30*  (2006.01)

(52) U.S. Cl.
CPC .... *G06F 17/30516* (2013.01); *G06F 17/30445* (2013.01); *G60F 17/30545* (2013.01)
USPC ........................................................ 707/718

(58) Field of Classification Search
CPC ................... G06F 17/30516; G06F 17/30424; G06F 17/30929
USPC ........................................................ 707/718
See application file for complete search history.

(56) References Cited

U.S. PATENT DOCUMENTS

| 2009/0106198 A1* | 4/2009 | Srinivasan et al. ................ 707/3 |
| 2009/0106214 A1* | 4/2009 | Jain et al. .......................... 707/4 |
| 2009/0228465 A1 | 9/2009 | Krishnamurthy et al. |
| 2011/0302164 A1 | 12/2011 | Krishnamurthy et al. |

OTHER PUBLICATIONS

"Shared Query Processing in Data Streaming Systems" by Saileshwar Krishnamurthy, Fall 2006.*
Saileshwar Krishnamurthy, "Shared Query Processing in Data Streaming Systems," University of California, Berkeley, 2006, pp. 1-212.

(Continued)

*Primary Examiner* — Jacob F Bétit
*Assistant Examiner* — Christy Lin
(74) *Attorney, Agent, or Firm* — Hickman Palermo Truong Becker Bingham Wong LLP

(57) ABSTRACT

Systems, methods, and media are disclosed herein that can be embodied in a traditional Relational Database Management System (RDBMS) in order to transform it into a Streaming Relational Database Management System (SRDBMS). An SRDBMS may provide functionality such as to manage and populate streams, tables, and archived stream histories and support the evaluation of continuous queries on streams and tables. Both continuous and snapshot queries support the full spectrum of the industry standard, widely used, Structured Query Language. The present technology can support a high number of concurrent continuous queries using a scalable and efficient shared query evaluation scheme, support on-the-fly addition of continuous queries into a mechanism that implements the shared evaluation scheme, reuse RDBMS modules such as relational operators and expression evaluators, and visualize results of continuous queries in real time.

8 Claims, 4 Drawing Sheets

(56) References Cited

OTHER PUBLICATIONS

Altinel, Mehmet et al. "Cache Tables: Paving the Way for an Adaptive Database Cache." Proceedings of the 29th VLDB Conference, Berlin, Germany, 2003.

Franklin, Michael J. et al. "Design Considerations for High Fan-in Systems: the HiFi Approach." Proceedings of the 2nd CIDR Conference, Asilomar, California, 2005.

Krishnamurthy, Sailesh et al. "On-the-Fly Sharing for Streamed Aggregation." SIGMOD Conference 2006, Chicago, Illinois, Jun. 27-29, 2006.

Krishnamurthy, Sailesh et al. "The Case for Precision Sharing." Proceedings of the 30th VLDB Conference, Toronto, Canada, 2004.

Krishnamurthy, Sailesh et al. "Shared Hierarachical Aggregation for Monitoring Distributed Streams." Report No. UCB/CSD-05-1381. Computer Science Division, University of California, Berkeley, Oct. 18, 2005.

Chandrasekaran, Sirish et al. "TelegraphCQ: Continuous Dataflow Processing for an Uncertain World." Proceedings of the 1st CIDR Conference, Asilomar, California, 2003.

Krishnamurthy, Sailesh et al. "Telegraph CQ: An Architectural Status Report." Bulletin of the IEEE Computer Society Technical Committee on Data Engineering, Nov. 18, 2003.

Krishnamurthy, Saileshwar. "Shared Query Processing in Data Streaming Systems." A dissertating submitted in partial satisfaction of the requirements for the degree of Doctor of Philoshophy in Computer Science in the graduate division of the University of California, Berkeley. Fall 2006.

"Shared Query Processing in Data Streaming Systems", by Saileshwar Krishnamurthy, Fall 2006, http://citeseerx.ist.psu.edu/viewdoc/download? Doi=10.1.1.122.1989&rep1&type=pdf.

T. Johnson et al., "A Heartbeat Mechanism and its Application in Gigascope", Proceedings of the $31^{st}$ VLDB Conference, Norway 2005, pp. 1079-1088.

Nalamwar, A., "Blocking Operators and Punctuated Data Streams in Continuous Query Systems" Compter Science, Feb. 1, 2003, pp. 1-19.

Tucker, Peter A. et al., "Exploiting Punctuation Semantics in Continuous Data Streams", IEEE Transactions on Knowledge and Data Engineering, May/Jun. 2003, pp. 555-568.

\* cited by examiner

ADDITION AND PROCESSING OF CONTINUOUS SQL QUERIES IN A STREAMING RELATIONAL DATABASE MANAGEMENT SYSTEM

CROSS-REFERENCE TO RELATED APPLICATIONS

This application claims the priority benefit of U.S. Provisional Patent Application No. 61/068,572 filed on Mar. 6, 2008, titled "On-the-Fly Addition, Shared Evaluation, and Declarative Visualization of Continuous SQL Queries in a Streaming Relational Database Management System," which is incorporated herein by reference. The present application is with U.S. patent application Ser. No. 12/398,959 filed on Mar. 5, 2009, titled "Systems and Methods for Managing Queries," which also claims priority to U.S. Provisional Patent Application No. 61/068,572.

FIELD OF THE APPLICATION

The present application relates to database management.

SUMMARY

Various embodiments of the invention disclose techniques that can be embodied in a traditional RDBMS (Relational Database Management System) in order to transform it into an SRDBMS (Streaming Relational Database Management System). Such a transformed SRDBMS may provide at least the following functionality:
1. Manage and populate streams, tables, and archived stream histories.
2. Support the evaluation of continuous queries on streams and tables.
3. Both continuous and snapshot queries support the full spectrum of the industry standard, widely used, Structured Query Language (SQL).

Various embodiments of the invention provide:
1. Support for a very high number of concurrent continuous queries using a highly scalable and efficient shared query evaluation scheme.
2. Support for on-the-fly addition of continuous queries into the mechanism that implements the shared evaluation scheme.
3. To reuse existing modules of the RDBMS such as relational operators and expression evaluators as much as possible.
4. To visualize the results of continuous queries in real time

DETAILED DESCRIPTION

A Relational Database Management System (RDBMS) is used to store and manipulate finite sets of structured data. At a bare minimum, an RDBMS provides facilities to create and populate database objects such as tables, modify the contents of these objects, and evaluate SQL queries that process one or more tables in order to produce a relation as an output. Moreover, a traditional database uses a paradigm called "store first, query later" where new data is stored in the database before it can be queried. In effect, these systems manage data that is "at rest" where a query operates on a snapshot of the database at any point in time—such a query is called "snapshot queries" (SQ). An SQ runs in a finite amount of time and produces a single set of records every time it is invoked.

Figure 1:
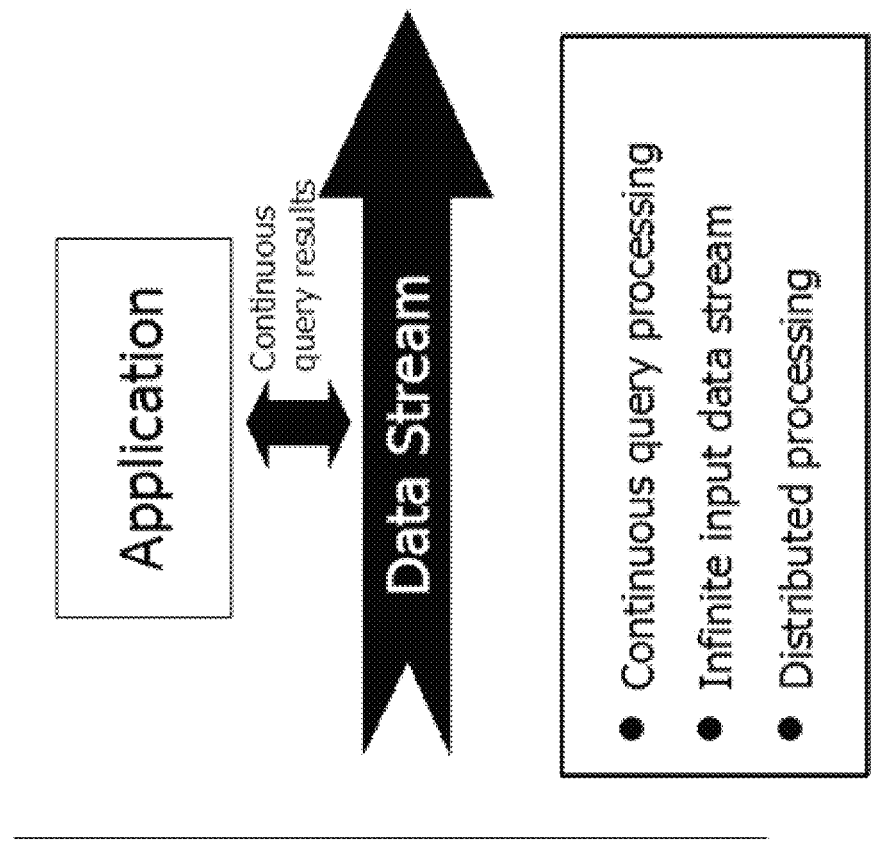
FIG. 1 is a block diagram illustrating a database centric environment and a database stream environment.
Figure 1:
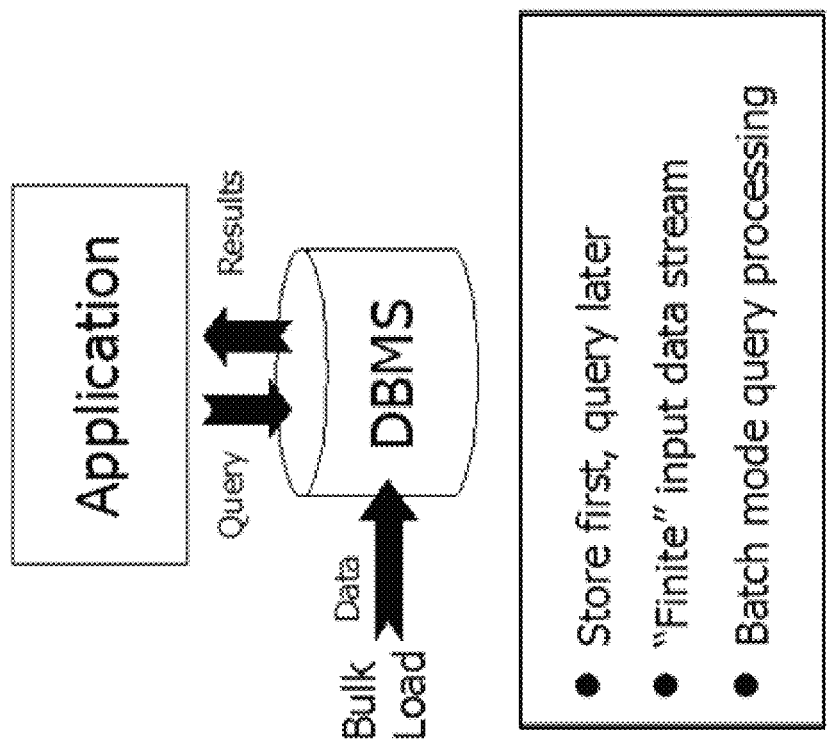

FIG. 1 illustrates the contrasts between database-centric approaches versus datastream-centric approaches. Streams of data may include data that is "on the move" in addition to data that is at rest. Systems that manage streams of data are called Streaming Relational Database Management Systems (SRDBMS) and are disclosed herein. A query that is deployed over one or more stream in an SRDBMS runs forever and is called a "continuous query" (CQ). As a new datum enters the system it is processed in order to produce additional results for the queries. Logically, a stream of data can be thought of as an unbounded set of tuples (i.e., records), ordered by a designated timestamp attribute called the CQTIME attribute. A stream appears in a CQ with an associated "stream-to-relation" (StoR) or window clause that expresses how to generate an ordered sequence of finite relations from an unbounded stream. The semantics of a CQ is to apply its associated SQ (formed by eliding all StoR clauses in the CQ) in turn on each such finite relation in the generated sequence, and concatenating the resulting relations into an output stream.

A stream query processor such as an SRDBMS is primarily used for monitoring and alerting applications. However, an SRDBMS is more than a vanilla stream query processor since it integrates the world of streams with those of relations. Thus, in addition to monitoring applications, an SRDBMS can be used to dramatically speed up the performance of traditional analytical and reporting database systems. This performance boost is achieved by exploiting the fact that all data originates as part of some stream (e.g., application, transaction, logs) and can be pre-processed in incremental fashion using CQ technology.

Various embodiments of the invention can be realized using several techniques that are added to a traditional RDBMS along with the development of a client-server internet infrastructure. We first describe the general architecture of such a system (a Streaming RDBMS) and then embodiments of the invention. Note that, while this document refers to the names of certain data structures and components from the PostgreSQL RDBMS for ease of exposition, the techniques that comprise the embodiments of the invention can be implemented in any traditional RDBMS.

Figure 2:
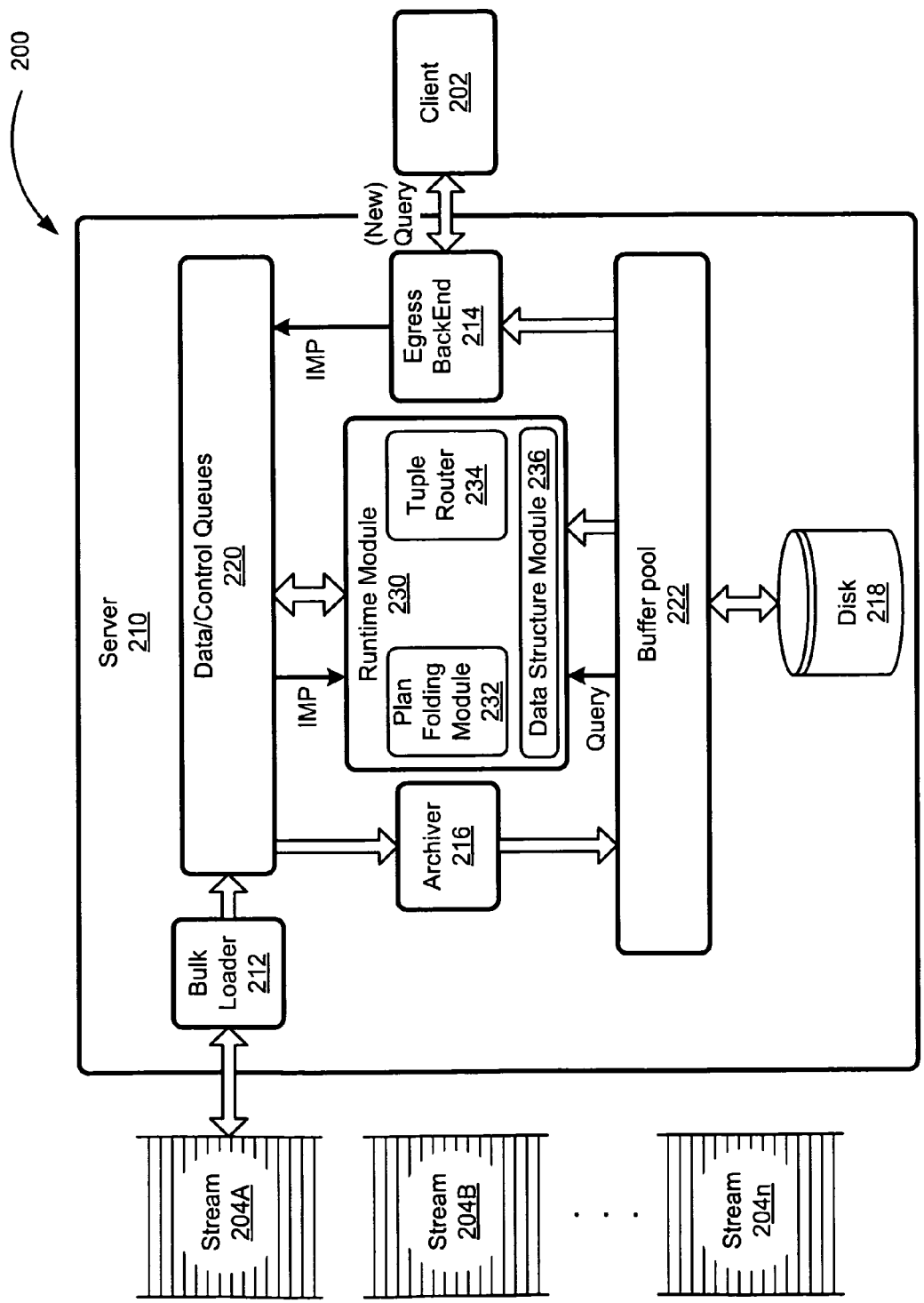
FIG. 2 is a block diagram illustrating an embodiment of a streaming relational database management system.

FIG. 2 illustrates an exemplary environment in which embodiments of the present invention may be practiced. FIG. 2 illustrates a block diagram of an embodiment of a streaming relational database management system (SRDBMS) 200 in accordance with aspects of the technology. As with all other figures provided herein, FIG. 2 is exemplary only. The system 200 includes a client 202 in communication with a server 210. For simplicity and clarity, only one client 202 is illustrated in FIG. 2. However, a person having ordinary skill in the art will appreciate that multiple clients 202 may communicate with the server 210.

In some embodiments, the server 210 may include a bulk loader 212, an egress backend 214, an optional archiver 216, a disk 218, data/control queues 220, a buffer pool 222, and a runtime module 230. The egress backend 214 may include a planner, a parser, an optimizer, an executor, and/or the like (not illustrated). The buffer pool 222 may be a disk cache. The runtime module 230 includes a plan folding module 232, a tuple router 234, and a data structure module 236. Further details of these elements are provided later herein.

The bulk loader 212 is configured to receive tuples from one or more stream 204A . . . 204n. In some embodiments, the bulk loader 212 receives tuples from a client application (not shown) configured to process streams of data (e.g., stream 204A-204n) and provide the tuples to the bulk loader 212. For simplicity and clarity, only one bulk loader 212 is illustrated in FIG. 2. However, a person having ordinary skill in the art will appreciate that the server 210 may include multiple bulk loaders 212 in communication with multiple streams 204A . . . 204n. In some embodiments, the streams 204A . . . 204n communicate the tuples to the server 210 via a network (not shown). The network may be a local area network, a wide area network, a wireless network, a mobile network, the Internet, the world wide web, a client and/or the like. Vast arrays of information may be accessible via data sources coupled to networks other than Streams 204A . . . 204n. For example, data can be supplied by one or more data sources within a local area network, a wide area network, and/or a mobile network. The bulk loader 212 may provide the tuples received from the streams 204A . . . 204n to the data/control queues 220.

In some embodiments, the bulk loader 212 and the egress backend 214 comprise common code configured to receive data including queries and/or tuples from a client application. The common code may be referred to as a bulk loader 212 when receiving tuples. The common code may be referred to as an egress backend 214 when receiving a query.

The data/control queues 220 may be configured to receive tuples from the bulk loader 212 and/or the runtime module 230. The data/control queues 220 may provide the received tuples to the archiver 216, the runtime module 230, and/or the egress backend 214. For example, data/control queues 220 may provide the tuples received from the bulk loader 212 and/or the runtime module 230 to the archiver 216 for storage on the disk 218. The data/control queues 220 may also retrieve the tuples from the bulk loader 212 and provide them to the runtime module 230 for processing.

In some embodiments, the data/control queues 220 and the buffer pool 222 both occupy shared memory. However, they may serve different functions. For example, the buffer pool 222 may function as a disk cache configured to store and retrieve data from tables (e.g., on the disk 218). Thus, the archiver 216 may write data to the disk 218 via the buffer pool 222. However, the buffer pool 222 may be separate and distinct from the data/control queues 220.

The disk 218 may be a computer readable medium configured to store data. Computer readable storage media may include a hard disk, random access memory, read only memory, an optical disk, a magnetic disk, virtual memory, a network disk, and/or the like. Data may include tuples, tables, variables, constants, queries, continuous queries, programs, IMPs, SCPs, and/or the like. The disk 218 may also store instructions for execution by a processor (not shown), which causes the processor to manage a query. In various embodiments, instructions for execution on the processor include instructions for implementing the bulk loader 212, the egress backend 214, the archiver 216, the data/control queues 220, the buffer pool 222, and/or the runtime module 230 (including the plan folding module 232, the tuple router 234, and the data structure module 236).

The egress backend 214 may receive a query from the client 202. In various embodiments, the query is a CQ or a static query. Optionally, the query received from the client 202 is a new query. The egress backend 214 is configured to process the new query using a planner, a parser, an optimizer and/or an executor. In some embodiments, the egress backend 214 provides an IMP to the data/control queues 220. The data/control queues 220 may provide the IMP to the runtime module 230. The plan folding module 232 of runtime module 230 is configured to fold the received IMP into a SCP in the data structure module 236. Alternatively, the data/control queues 220 may store the IMP on the disk 218 (e.g., via the archiver 216 and the buffer pool 222) for later use.

In some embodiments, the data/control queues 220 receives database objects (such as streams, tables, relations, views, and/or the like) and provides the database objects to the buffer pool 222 via the archiver 216. The buffer pool 222 may store the database objects on the disk 218. The data/control queues 220 may provide the database objects to the runtime module 230. Optionally, the data/control queues 220 provide multiple objects to the runtime module 230 at the same time. For example, the data/control queues 220 may provide tuples from two or more streams 204A . . . 204n and a table to a SCP in the data structure module 236 of the runtime module 230.

The runtime module 230 is configured to receive tuples and/or tables from the data/control queues 220. The runtime module 230 may evaluate the tuples and/or tables using the tuple router 234 and the data structures in the data structure module 236. In various embodiments, the runtime module 230 outputs streams, tables, and/or data to the data/control queues 220. The data/control queues 220 may communicate output from the runtime module 230 to the client 202 via the egress backend 214. For example, the data/control queues 220 may receive a tuple from the runtime module 230 and provide the tuple to the archiver 216. The archiver 216 may provide the tuple to the buffer pool 222. The buffer pool 222 may provide the tuple to the egress backend 214. The egress backend 214 may provide the tuple to the client 202. Alternatively, the buffer pool 222 may provide the tuple to the disk 218. Thus, the data/control queues 220 may store output from the runtime module 230 onto the disk 218 via the archiver 216 and the buffer pool 222.

Various kinds of objects (e.g., tables or views) behave like relations in a traditional RDBMS. Objects that behave like streams may be used in the SRDBMS 200. In various embodiments, a stream (e.g., the streams 204A . . . 204n) is classified as a raw stream or derived stream. The classification may be based on how the stream is populated. A raw stream may be populated by an external data provider. In some embodiments, the external data provider connects to the server 210 using a secure and well-defined protocol that authenticates itself, and advertises the identity of the stream being populated. If authorized, the provider may provide data tuples that are appended to the stream. In practice, a data provider will use a call-level API that the SRDBMS provides.

A produced stream may be defined using a query (e.g., a defining query) and may be populated by the SRDBMS 200. A produced stream may be one of multiple types of database objects, including a view and a derived stream. A view may be a database object that is defined using a query and has macro semantics. A view may be defined using a CQ as a streaming view. A view may be used in another query in a place that a raw stream can be used. A defining query of a view runs only when a query that uses the view runs as well.

In some embodiments, a derived stream is a materialized CQ that may be associated with a stream using a special syntax (e.g., CREATE STREAM . . . AS query). The associated stream is similar to a view and may be used in another query in a place that a raw stream can be used. Unlike a view, however, a derived stream does not have macro semantics. A derived stream may be active, whether or not it is used in another active query. A raw stream and/or a derived stream may be stored on the disk 218, as discussed elsewhere herein. For example, a raw stream and/or a derived stream may be archived using the archiver 216 for storing on the disk 218.

In some embodiments, the runtime module 230 receives a query from the disk 218 via the buffer pool 222. The runtime module 230 may also receive various kinds of objects (e.g., a stream, a data table, metadata, tuples, views, relations, expressions, and/or the like) from the buffer pool 222. These objects may be received by the buffer pool 222 from the disk 218 and/or the archiver 216.

Figure 3:
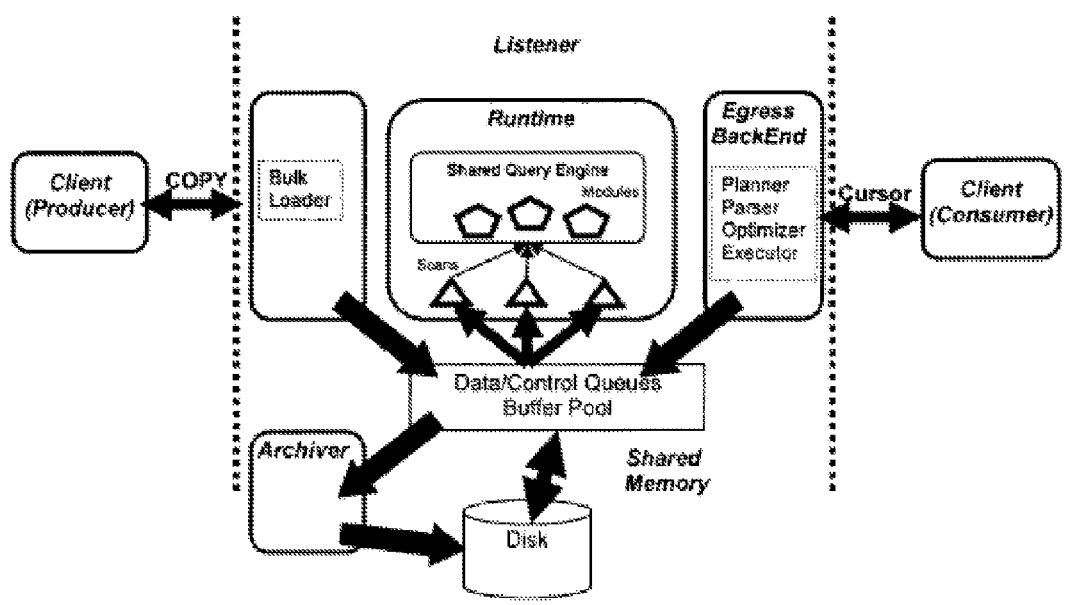
FIG. 3 is a block diagram illustrating an embodiment of a streaming relational database management system.

FIG. 3 illustrates the architecture of an SRDBMS that is built using such an RDBMS as a substrate. The following embodiments are exemplary and are meant to be illustrative of the disclosure herein. The examples are not intended to be interpreted as limiting the scope of the present disclosure.

In a traditional process-oriented RDBMS, there is generally a process that listens on to incoming connections on a specified socket (the Listener) and forks off a separate "backend process" to handle a new connection. In addition to the Listener, there may be a process dedicated to shared evaluation of CQs (the Runtime) as well as process dedicated to archiving the results of CQs (the Archiver) in tables. The Archiver process is used to materialize the results of a CQ into a persistent RDBMS object such as a traditional table, called an active table. Ingress and Egress of data may be accomplished using standard backend processes and protocols. More specifically, a client producing data for a stream can connect to a backend and use the standard bulk loader for tables (a protocol called COPY) to push data into a stream—the backend process takes the incoming records and writes them onto data queues. A client that needs to consume data from the system can connect to a backend and issue a CQ using a cursor (in a manner identical to an SQ) and continuously fetch the results of the CQ by manipulating the cursor.

When a backend process receives a query it uses an optimizer to produce an execution plan that comprises a tree of relational operators conforming to the well-known "iterator" model. If the query in question is an SQ, the backend evaluates the execution plan individually using its executor component, as would the case be in a traditional RDBMS. If, on the other hand, the query is a CQ the backend sends the associated execution plan to the Runtime for shared evaluation using a control queue. In the latter case, for example, the backend actually evaluates a small "stub" execution plan that consists solely of a Scan operator that reads records from an internal queue in response to FETCH requests from a cursor.

When the Runtime process fetches a new query plan, it merges the new query plan on-the-fly onto a novel shared query plan—this process is called "plan folding." The shared query plan comprises a set of special CQ operators and an associated "routing table." Apart from plan folding, a responsibility of the Runtime is to process incoming data records that are fetched from data queues. The runtime accomplishes this by adaptively routing tuples through the CQ operators that constitute the shared plan. These CQ operators perform their associated tasks by reusing the existing implementation of iterator-style relational operators in the RDBMS. In other words, these CQ operators maintain the information associated with sharing multiple concurrent queries by "orchestrating" an arbitrary portion of a standard query plan. Some of these CQ operators, have the added responsibility of writing their results to data queues, from where the tuples are further processed by either an egress backend or the Archiver process.

A stream can be thought of as an unbounded, potentially infinite, bag of tuples, where each tuple has a clearly delineated "timestamp" attribute. In practice, a stream is a database object that is defined with a schema similar to that of a relation, and tuples are appended to a stream as they "arrive" in the system.

The schema of a stream is distinguished from that of a relation by the following requirements:
1. The designated "timestamp" attribute of a stream is identified using a CQTIME constraint with syntax that is similar to that of NOT NULL and UNIQUE constraints while defining tables.
2. Every stream has one, and only one, attribute with a CQTIME constraint, and this attribute has an ordinal type that is one of SMALLINT, INTEGER, BIGINT, TIMESTAMP, or TIMESTAMPTZ.
3. The values of the CQTIME attribute are monotonically increasing for newer tuples that arrive in the stream.

In the SRDBMS, there can be different kinds of database objects that behave like streams, just as there can be different kinds of objects that behave like relations (e.g., tables, views) in a traditional RDBMS. Thus, streams can be classified as being, for example, raw streams, or derived streams, based on how they are populated:
1. Raw streams. A raw stream is populated by an external data provider that connects to the system using a secure and well-defined protocol that authenticates itself, and advertises the identity of the stream being populated. If authorized, the provider then proceeds to pump in data tuples that are appended to the stream. In practice, a data provider will use a call-level API that the SRDBMS provides.
2. Produced streams. A produced stream is sometimes defined using a query (the "defining query") and is populated by the SRDBMS. A produced stream can be one of the following types of database objects:
   a. View. A view that is defined with a continuous query is a streaming view, and can be used in another query in any place that a raw stream can be used. The defining query of a view runs when a query that uses the view is actually running. This is because a view is a database object that is defined with a query and has "macro" semantics. A use of a view in another query is identical to explicitly exploding the view's defining query as a sub-query.
   b. Derived streams. A materialized continuous query is explicitly associated with a stream using a special syntax: CREATE STREAM . . . AS query. The associated stream is similar to a view and may be used in another query in any place that a raw stream can be used. Unlike a view, however, a materialized query does not have macro semantics, and is sometimes active whether or not it is used in another active query.

A raw or derived stream can optionally be archived.

In order to provide context for the details of the embodiments of the invention disclosed herein, a brief description of the syntax and semantics of SQL-based continuous queries is provided. A continuous query (CQ) operates over a set of streams and relations, and produces a stream as output. In order to understand the execution model of a CQ a CQ is distinguished from a snapshot query (SQ) in at least the following ways:
1. The FROM clause of a CQ has at least one stream.
2. Streams may not appear anywhere else (e.g. WHERE clause) in a CQ.
3. A stream in the FROM clause of a CQ may be a stream, a Derived streams, a view, or an inline sub-query. Furthermore, a streaming sub-query may be executed as an independent "inner" CQ that produces streaming results that can be used to process the "outer" CQ.

4. A stream in the FROM clause of a CQ can be optionally associated with a Stream-to-Relation (StoR) operator (informally called a "window" clause). The StoR operator describes both the content of a visible set, as well as how the visible set changes over time (e.g., advance by row, advance by time). A visible set of a stream can be thought of as a temporary relation and is valid until it is redefined by the next visible set produced for the same stream.

5. While there can be more than one stream in the same FROM clause of a given CQ, in order to express a stream-stream join, or a self-join involving streams, all but one of these streams may be defined with a special StoR called a "current window." The "current window" of a stream treats the latest window produced by it as a finite set of records.

6. The SELECT clause of a CQ can optionally be associated with a Relation-to-Stream (RtoS) operator that is defined using syntax similar to a DISTINCT clause. An RtoS operator takes a sequence of relations as input and produces a sequence of relations as output.

7. The Relation-to-Relation (RtoR) operator corresponds to the underlying SQ that can be produced by stripping the CQ of its StoR and RtoS clauses.

The SRDBMS offers the capability to execute continuous queries over streams and relations in the standard, and well-understood, SQL query language.

The execution of a CQ can be easily and unambiguously understood in terms of its StoR operators, its RtoS operator, and its RtoR operator as follows:

1. Apply StoR operators: Every StoR operator (informally called a "window") is continually applied to each associated stream in order to produce an unbounded sequence of visible sets.

2. Apply RtoR operator: Every time a new visible set is produced by an StoR operator, the RtoR operator (i.e., the underlying SQ) is applied on the visible sets and other relations in the FROM clause in order to produce an unbounded sequence of relations.

3. Relation-to-Stream (RtoS) operator: Every time a new relation is produced by applying the RtoR operator, it is used to produce a new "window" of tuples, generally by comparing the relation freshly produced by the RtoR operator with previous relations produced by the RtoR operator. The RtoS operator in the SRDBMS may be used to append successive windows of tuples in order to form a stream.

Stream-to-Relation (StoR) Operators

The SRDBMS offers a wide range of StoR operators in order to satisfy a variety of use cases. Most of these variants are specified in terms of "intervals" that describe contiguous subsequences of the underlying stream. These intervals can be specified in three different kinds of units:

1. Row-based: This interval contains a fixed number of rows in the associated stream. The interval is sometimes specified as an integer: for example, 25 ROWS.

2. Time-based: This interval contains all the rows that fall into a fixed range of time in the associated stream. The data type of this interval depends on the CQTIME type used by the associated stream. For example, when the CQTIME of the stream is a TIMESTAMP, a time-based interval is specified as an INTERVAL value.

3. Window-based: This interval can only be used with a produced stream. It contains all the rows in a fixed number of windows in the underlying stream. It therefore provides a level of abstraction, allowing the properties of a higher-level query to be specified in terms of the StoR used by a lower-level query.

More specifically, the SRDBMS supports the following varieties of StoR operators (the details and the formal syntax are explained herein):

1. Sliding windows: A sliding window is expressed using an advance interval, and a visible interval. The former defines the periodic intervals (and thus, the actual edges) at which a new visible set is constructed from the stream, while the latter defines the interval of tuples, relative to the periodic edges, that belong in each visible set. Note that both intervals can be either time or row based intervals. When the visible interval exceeds the advance interval, successive visible sets can be thought of as being "sliding" or "moving" windows, and a tuple in a stream can thus belong to multiple visible sets.

2. Chunking windows: A chunking window is expressed using either a SAME TIME clause, or a sequence of intervals of the same type (e.g., '2 seconds', '3 seconds', '2 seconds'). In the former case, a new visible set is defined every time there is a new tuple in the stream with a timestamp (CQTIME attribute) that is different from the previous tuple. That is, each visible set comprises all tuples with identical timestamps. In the latter case, visible sets correspond to sets of tuples whose sizes are defined by the sequence of intervals that is used to express the window, and these visible sets continuously cycle through the sequence of intervals with a period equal to the sum of the intervals in the sequence. Note that in both cases, the underlying stream is broken into successive, contiguous, and non-overlapping "chunks" of tuples.[1]

[1] Such non-overlapping windows are often efficient to implement as they generally require no buffering of input data.

3. Landmark windows: A landmark window is expressed using an advance interval, and a reset interval. The former defines the periodic interval (and thus, the actual "advance edges") at which a new visible set is constructed from the stream, while the latter defines a periodic interval that is used to compute a sequence of "reset" edges. Each visible set comprises all tuples that have arrived in the stream after the latest reset edge. The landmark window is unbounded, and can be visualized as a "rubber-band interval" with a fixed left edge, and a right edge that keeps stretching at every advance point, and a left edge that catches up (snaps) with the right edge at every reset point. Note that both the advance and reset intervals can be either time or row based.

The SELECT Command

The enhancements (shown in bold) made to the SELECT statement of ISO standard SQL in order to support streams are described in the following syntax diagrams:

```
SELECT
    [ ALL | DISTINCT [ ON ( expression [, ...] ) ] ]
    * | expression [ AS output_name ] [, ...]
    [ FROM from_item [ stream_to_relation ] [, ...] ]
    [ WHERE condition ]
    [ GROUP BY expression [, ...] ]
    [ HAVING condition [, ...] ]
    [ { UNION | INTERSECT | EXCEPT } [ ALL ] select ]
    [ ORDER BY expression [ ASC | DESC | USING operator ]
        [, ...] ]
    [ LIMIT { count | ALL } ]
    [ OFFSET start ]
```

-continued

```
and stream_to_rel is:
 < window_expr [ START AT 'time' ] >
 where window_expr can be one of:
  VISIBLE slice_expr ADVANCE slice_expr
  [ SAME TIME ] | SLICES slice_expr [, ...]
  LANDMARK RESET AFTER slice_expr ADVANCE slice_expr
 where slice_expr can be one of:
  'interval'
  integer-const ROWS
  integer-const WINDOWS
```

The clauses that already exist in SQL are available in the ISO standard. We now explain the new parameters that are specific to the CQE, and whose syntax was described above:
1. stream_to_relation: This optional clause is used to express the StoR operator for a stream in a CQ that was explained earlier.
    The StoR is only valid if the from_item is a stream, a streaming view, a derived stream, or an inline streaming sub-select (i.e., a sub-select that is a CQ). Note that it is perfectly legal to have a non-streaming sub-select that operates only over relations.
    If an element of the FROM clause specifies a stream but no StoR is specified, a default StoR clause is used. If the associated stream is a raw stream, the default StoR is equivalent to <slices 1 rows>; if the associated stream is a streaming sub-query or a derived stream, the default StoR is <slices 1 windows>.

Summary of Techniques

We now disclose a summary of techniques in various embodiments of the invention. Details on each of these techniques will be provided in subsequent sections of this document.
1. The Shared CQ Executor and Plan Folding: A principled algorithm that walks the operators of a classical iterator-style query plan in order to produce a "recipe of instructions" that govern how the query plan can be folded into the shared CQ plan.
2. Orchestrating iterator-model sub-plans for streaming: A mechanism for shared evaluation of relational algebra on streaming data that orchestrates data through an arbitrary sub-plan of iterator-model operators.
3. Unified windowing infrastructure: This is a method to implement different kinds of StoR clauses (sliding, chunking, landmark) in a unified fashion to support shared evaluation. A signal innovation is the data-driven approach to additive lag elimination—a critical feature to reduce latency in query results.
4. Visualization infrastructure: This is a mechanism that enables users to configure rich and complex dashboards that are driven by the results of continuous queries.

The Shared CQ Executor and Plan Folding

In this section, we describe two aspects of an SRDBMS:
1. How it represents and executes multiple concurrent CQs in a shared fashion
2. How it "folds" a classic query plan for a new CQ on to an existing shared plan used to process multiple concurrent CQs.

As a prelude to the description of plan folding, we first present a brief overview of query evaluation plans that use the iterator model and how such a plan is processed by a traditional executor.[2]

Iterator Model Query Plans and Executor

A query plan that conforms to the iterator-model is typically represented as a tree of operators. The leaves of the tree are scan operators that fetch records from data sources, typically heap and index files located on attached storage. Most operators are either unary (e.g., Aggregate) or binary (e.g., Joins), although n-ary operators are possible (e.g., Union). A query plan is produced by an optimizer, typically after parse and rewrites phases, and then evaluated using an executor. An example iterator model plan for a simple query is shown in the simple iterator model below.

The executor processes a tree of operators that are each represented by a "plan nodes." The plan tree is a demand-pull pipeline of tuple processing operations. Each node, when called, will produce the next tuple in its output sequence, or NULL if no more tuples are available. If the node is not a primitive relation-scanning node, it will have child node(s) that it calls in turn to obtain input tuples.

EXPLAIN Produced for a Simple Iterator Model Query Plan

```
cqdb=# explain  select     a, sum(b)
                from       foo
                where      c > 10
                group by   a
                order by   a
                limit      10;
                      QUERY PLAN
---------------------------------------------------------------------
 Limit  (cost=37.94..37.97 rows=10 width=8)
   ->  Sort  (cost=37.94..38.11 rows=67 width=8)
         Sort Key: a
         ->  HashAggregate  (cost=35.08..35.91 rows=67 width=8)
               ->  Seq Scan on foo   (cost=0.00..32.12 rows=590 width=8)
                     Filter: (c > 10)
(6 rows)
```

Refinements on this model include:
1. Rescan command to reset a node and make it generate its output sequence over again.
2. Parameters that can alter a node's results. After adjusting a parameter, the rescan command is applied to that node and all nodes above it.

More precisely, an operator is typically implemented in a generic fashion totally independent of its children. Thus, any function invoked on an operator in the tree, results in the same call being invoked on its children. Each operator implements the "iterator" interface that consists primarily of the following four functions:
  init( ): Initializes the operator
  next( ): Fetches the next tuple, typically by repeatedly calling next( ) on its children until a tuple can be produced.
  rescan( ): Resets the operator with any associated parameters whose values are bound on-the-fly such as index keys. In practice, rescan( ) is actually called by the dispatcher routine for next( ) that consults a lookup table to figure out which specific function to call for a given operator. The dispatcher checks to see if any parameter associated with the operator has been reset and if so it calls rescan( ) on the operator before calling next( ).
  close( ): Shuts down the operator A sub-component of the executor is the "expression evaluator." This is responsible for evaluating various expressions (for target list projection, qualification conditions etc.) that are based on data from tuples that are fetched from the operator's children. An expression is generally represented as a straightforward parse-tree where the atomic nodes are either constants or attributes (called Var nodes) from a tuple produced by a child of the operator. While each Var node generally only needs to identify the specific child that produced the tuple as well as the position of the attribute within the tuple, it is generally possible to further decorate the Var node to identify the specific original Scan node and attribute position it is derived from, provided the attribute is not entirely produced by an intermediate operator, such as an Aggregate, in the query plan. The original Scan is identified in the Var node with a reference to an entry in a data structure called "range table" which has one entry for each data source in a single select-project-join (SPJ) query block. Note that a nested sub-select that appears in a FROM clause will also result in an entry in the range table.

Shared CQ Plan and Tuple Router

The shared CQ plan (SCP) is a data structure that includes specialized CQ operators. The SCP is processed by a novel executor called the TupleRouter in a manner explained more fully herein. An SCP is similar to an iterator model plan (IMP) only in as much as both data structures represent dataflow operations. However, an SCP differs from an IMP in many ways and has at least the following properties:

- An SCP can be thought of as a directed acyclic graph (DAG) and not a tree of operators.
- An SCP is used to produce and process CQ tuples that consist of a combination of individual "base" tuples and metadata associated with book-keeping for sharing. The signature of a CQ tuple is a composite key with one entry for each constituent base tuple where each entry uniquely identifies the operator that produced the associated base tuple.
- An SCP operates by "pushing" CQ tuples from leaf (up-stream) nodes to higher level (downstream) nodes.
- An SCP is flexible and capable of accommodating changes—typically in the form of query addition and removal.
- An SCP allows for adaptive tuple routing and can accommodate multiple different routes for data. In other words, multiple CQ tuples that are produced by the same operator (i.e., have the same signature) can take different paths through subsequent operators.

In some embodiments, an SCP may be represented by a routing table that encodes the various possible routes for tuples in a shared dataflow. This routing table is implemented as a hash table that maps CQ tuple signatures to an OpGroup, i.e., a group of CQ operators that are intended recipients of the CQ tuple.

Similarly, although a CQ operator has a superficial similarity to a traditional IMP operator it actually implements an interface with the following substantial differences:

- Since the SCP is "push" based, a CQ operator is called with an input CQ tuple to process. This is different from an IMP operator that is called with no inputs but relies on calling its children for tuples to process.
- As part of processing its input CQ tuple, the operator may produce a set of output tuples. Each of these output tuples have to be sent to one or more downstream operators. This is accomplished by having the CQ operator pass each output tuple to the TupleRouter for further downstream evaluation.
- Since a CQ operator may be shared amongst different queries it needs to support ways to add and remove queries on the fly.

In some embodiments, a CQ operator implements the following interfaces:

init( ): Initialize the operator
exec(CqTuple *): Execute the operator
add_query( ): Add a query to the operator
remove_query( ): Remove a query from the operator
end( ): Destroy the operator As its name suggests, the TupleRouter is responsible for "routing" CQ tuples through a network of CQ operators. Unlike a traditional IMP executor which processes tuples through a static fixed dataflow, the TupleRouter processes tuples through an adaptive dataflow where successive tuples with identical signatures can take different paths through the network of CQ operators. Thus, given a CQ tuple, a central function of the TupleRouter is to lookup the OpGroup corresponding to its signature, and route the tuple to each of the candidate operators in the OpGroup. Furthermore, the operators in an OpGroup are subdivided into a set of ordered subgroups based on certain rules of precedence. As part of the routing process the TupleRouter conforms to these precedence rules by ensuring that a CQ tuple is routed to all operators of a given subgroup before being routed to those of a subgroup with lower priority. The TupleRouter is, however, free to route a CQ tuple to the operators of a given subgroup in any order or based on any policy. A particularly effective policy is a lottery scheduling based approach which favors more efficient operators (i.e., those that eliminate a CQ tuple early in a dataflow).

In practice, the TupleRouter operates in a single thread of control orchestrated in a "major loop." In each iteration of the major loop, the router picks a leaf node (typically a Shared-Scan operator) and executes it by calling its exec( ) method. The leaf node produces an appropriate CQ tuple by reading off an input queue and then calls on the TupleRouter to further route the tuple to other downstream operators in the dataflow network.

The Plan Folding Algorithm

Plan Folding adds a new CQ onto a shared CQ plan, an data structure that is used to represent multiple concurrent CQs that are being executed in the Runtime process. The input for the plan folding algorithm is an iterator-model query plan (IMP) of the sort described above that is formed by running a standard query optimizer on a CQ, and where scans on streams are modeled with a StoRScan above a StreamScan node.

The CQ Runtime process is responsible for plan folding. When a new query is added to the system, the Runtime traverses the resulting IMP-style plan bottom-up and folds it into the tuple router—that is—it creates shared plan items, if necessary, which can be shared among queries.

Recall that an iterator-model plan has an accompanying local "range table" that has information identifying all relations and streams that are referenced in the plan. A range table is, in essence, a list of "range variables" each of which uniquely identifies a table/stream/function/sub-query. Similarly, the shared CQ plan, has an accompanying data structure called a "global range table" that identifies all relations and streams from various different queries that it references.

The components of plan folding may include the "varno" and "attno" transformations. The variables in the targetlist, quals etc. for any plan are represented by a Var structure, and are characterized by 2 main components (among others), namely the varno and attno. The varno identifies a range variable the from range table that in turn describes a specific table/stream that the variable is from, and the attno represents the attribute number of this variable in that relation. While the varno and attno may be local to a single specific query in the IMP, they are transformed in the shared CQ plan to ensure there are no conflicts and collisions across all the queries that the plan represents. Furthermore, these new varnos will be indexes into the CQ Tuple to get to the constituent "base" tuple. The transformed attnos will, in turn, identify a specific attribute in the "base tuple." The varno and attno transforms only change the varnoold and varoattno fields of the Var structure that are only used for debugging purposes in the RDBMS. The SRDBMS exploits these fields for execution. The fields that are used for execution in the RDBMS are the varno and varattno.

In summary, the plan folding process is accomplished by at least the following steps:
1. Non-destructively walk the new query plan bottom-up generating "transforms", "plan items" and "qual items"
   The transforms are applied to internal structures like varnos, attnos, scanrelids etc. so that the new plan can reference the global range variables rather than those present in the query's local range table.
   The plan items represent stubs of information that are used to determine either what is added to an already existing CQ operator, or a new CQ operator that is added to the plan.
   The qual items are similar to plan items and represent information specific to qualifiers, or predicates.
2. Apply the transforms—note that the order of the following operations is relevant:
   a. Apply the attno transforms to the input plan.
   b. Apply the varno transforms to the input plan
3. Modify the shared CQ plan appropriately:
   a. Apply the qual items.
   b. Apply the plan items.

Plan folding rules for various types of shared plan items, along with some illustrative examples, are described below.

Shared Scans
1. Create a shared scan plan item (if it does not exist already)
2. Create a varno transform from the scanrelid to the plan item's varno.
3. If it is not a streamscan, then this scan is on the right side of a mixed join. We cap this transform because this transform was only to enable the correct seek scan. All the ancestors of this mixed join refer to it as coming from a subplan item of the mixed join (see folding mixed join for details).
4. No attno transformations are required because this is the leaf node and the data is coming from only one source so attnos don't need to be changed.

StoR Scans

StoR scans are inserted for every windowing clause that is specified in a query. Usually, a StoR will sit on top of a Stream Scan or a result of a subquery or a view. The following happens in StoR scan folding:
1. Create a new StoR Scan plan item (if it does not exist already)
2. Since a StoR scan will only have a Shared Scan as its child, we will first cap the only varno transform for that query block (the one we created while folding Shared Scan).
3. We will add a varno transform from the underlying shared scan's scanrelid to the varno of the StoR plan item that we just created. All references to the vars which were coming from the scan under the StoR will now be changed to the StoR scan's varno. This transform will be effective from root of the plan tree to the StoR scan item we just created. We have the capped transform (from 2 above) effective below this node.
4. No attno transformations are required because the data is coming from only one source so attnos don't need to be changed.

```
create stream r1(a int, b int cqtime user) type unarchived;
explain select * from r1 <slices '3'>;
```

-continued

```
                            QUERY PLAN
---------------------------------------------------------------------
Result (1)    (cost=0.00..0.00 rows=0 width=0)
   -> StoR Scan (1.1)  < SLICES '3' >  (cost=0.00..0.00 rows=0 width=0)
            -> Stream Scan (1.1.1)  on r1   (cost=0.00..31.40 rows=2140 width=8)
FOLD EXPLAIN:
  INPUT RANGE TABLE:
    (1) RTE: (Kind:RTE_RELATION) (relid:81933) (alias:r1)
(Rels:)
  ATTNO TRANSFORMS:
  VARNO TRANSFORMS:
     [1] (old_varno:1) (new_varno:1) (start_at_node:1.1.1)
     [2] (old_varno:1) (new_varno:2) (stop_at_node:1.1.1)
  QUAL ITEMS:
  PLAN ITEMS:
     [1] (SCAN_ITEM)
         (plan:[1.1.1] STREAMSCAN) (varno:1) (rte_is_new:t)
         StoRDescriptor: NULL
         RTE: (Kind:RTE_RELATION) (relid:81933) (alias:r1)
(Rels:)
     [2] (STOR_ITEM)
         (plan:[1.1] STORSCAN) (varno:2) (rte_is_new:t)
         StoRDescriptor: (SD_CHUNKING) (partitions:0)
(fragments:0)
         RTE: (Kind:RTE_UNKNOWN) (Rels: 1)
     [3] (RESULT_ITEM)
         (plan:[1] RESULT) (varno:3) (rte_is_new:t)
         StoRDescriptor: (SD_CHUNKING) (partitions:0)
(fragments:0)
         RTE: (Kind:RTE_RESULT) (Rels: 2)
=========================================
(26 rows)
```

Subqueryscans

In case of a streaming subqueryscan plan node, a shared subquery plan item may be generated. We do the folding for the query block that is hanging off of the subquery just like it were a top level query block and then append all the transform (varno and attno) information to the main queries context which keeps all the transformation information. We also add a varno transformation from the scanrelid of the subqueryscan to the output of the already folded subplan's top level result item.

Mixed Joins

Mixed joins are a place where a new heap tuple component may be added to the CqTuple. This component is actually the join heap tuple (with the targetlist containing vars from the outer and the inner side of the join) that will be augmented to the incoming CqTuple. Mixed join code is capable of handling inline tables too. The folding part specific to inline tables will be covered in the inline table specification. In case of a mixed join with a streaming component as the outer and a non-streaming subquery as the inner, the plan folding may be done in the following way:
1. Create a Plan item for the Join plan node.
2. Create a Plan item for the subplan (the inner side of the join)
3. Gather all the varnos (by traversing recursively) of the inner subplan. These are the scanrelids of the non-streaming relations in the inner subplan.
4. For each of these varnos, create a varno transform from the varno to the new varno of the subplan shared item created in step 2 above.
5. There could be expressions in the targetlist which will have a varno of 0, so we may transform them to the new varno of the subplan shared plan item (also known as 0-varno-transforms). But there could already be 0-varno-transform (say it there was a mixed join as the outer child of this current mixed join). We may cap these 0-varno-transforms to be effective only from the outer plan of the mixed join.

6. Now, we add a 0-varno-transform from 0 to the sunplan shared item's varno. This will be effective from the root of the plan tree till the join node.
7. The join heap tuple (that will be augmented to the CqTuple), will have varnos from both inner and outer. Hence the attnos for these vars will be relative to the inner or the outer. We add attno transforms so that their attnos are correct when referred to the new varno that represents the entire join heaptuple. We may, for example, not alter the attnos of any vars that come from the outer since these vars will be accessed from the outer part of the CqTuple. We add attno transforms for all inner vars in the following way. If the oldattno is non-zero (regular var), then we change it to the position in the targetlist of the join. However, if the oldattno is zero, signifying it is an expression, there could be more than one expression and then we would wipe out the effects of all but the last attno transform. As such, a transform from 0 to the index in the target list may not be added. Hence, if the oldattno is zero then we copy the varattno to the oldattno field as a part of the attno transform.

```
create stream s1 (a int, b int, c int cqtime user) type
unarchived;
create table t1 (a int, b int);
create index t1_a_idx on t1 (a);
explain select s.c, s.a, (s.a + s.c) as sum1,
                 t.a, t.b, (t.b + s.c) as sum2
                 from s1 s, t1 t where s.a = t.a order
by 6;
                                QUERY PLAN
-----------------------------------------------------------------------
-----------------------------------------
   Result (1)    (cost=2790.96..2842.85 rows=20758 width=16)
      -> Sort (1.1)    (cost=2790.96..2842.85 rows=20758
width=16)
            Sort Key: ((t.b + s.c))
            -> Nested Loop (1.1.1)    (cost=0.00..1302.47
rows=20758 width=16)
                     -> StoR Scan (1.1.1.1)  < SLICES 1 ROWS >
(cost=0.00..0.00 rows=0 width=0)
                              -> Stream Scan (1.1.1.1.1)  on s1 s
(cost=0.00..29.40 rows=1940 width=8)
                              -> Index Scan (1.1.1.2)   using t1_a_idx on
t1 t   (cost=0.00..0.47 rows=11 width=8)
                                       Index Cond: (t.a = s.a)
   FOLD EXPLAIN:
      INPUT RANGE TABLE:
           (1) RTE: (Kind:RTE_RELATION) (relid:81936) (alias:s)
(Rels:)
           (2) RTE: (Kind:RTE_RELATION) (relid:81939) (alias:t)
(Rels:)
      ATTNO TRANSFORMS:
           [1] (varno:0 oldattno:0 newattno:0)     (stop:1.1.1.1)
           [2] (varno:2 oldattno:1 newattno:4)     (stop:1.1.1.1)
           [3] (varno:2 oldattno:2 newattno:5)     (stop:1.1.1.1)
           [4] (varno:0 oldattno:0 newattno:0)     (stop:1.1.1.1)
      VARNO TRANSFORMS:
           [1] (old_varno:1) (new_varno:1)
(start_at_node:1.1.1.1.1)
           [2] (old_varno:1) (new_varno:2)
(stop_at_node:1.1.1.1.1)
           [3] (old_varno:2) (new_varno:3)
(start_at_node:1.1.1.2)
           [4] (old_varno:2) (new_varno:5)
(stop_at_node:1.1.1.2)
           [5] (old_varno:0) (new_varno:5)
(stop_at_node:1.1.1.2)
      QUAL ITEMS:
      PLAN ITEMS:
           [1] (SCAN_ITEM)
              (plan:[1.1.1.1.1] STREAMSCAN) (varno:1)
```

```
              (rte_is_new:t)
                   StoRDescriptor: NULL
                   RTE: (Kind:RTE_RELATION) (relid:81936) (alias:s)
(Rels:)
           [2] (STOR_ITEM)
              (plan:[1.1.1.1] STORSCAN) (varno:2) (rte_is_new:t)
              StoRDescriptor: (SD_CHUNKING) (partitions:0)
(fragments:0)
              RTE: (Kind:RTE_UNKNOWN) (Rels: 1)
           [3] (SCAN_ITEM)
              (plan:[1.1.1.2] INDEXSCAN) (varno:3) (rte_is_new:t)
              StoRDescriptor: NULL
              RTE: (Kind:RTE_RELATION) (relid:81939) (alias:t)
(Rels:)
           [4] (JOIN_ITEM)
              (plan:[1.1.1] NESTLOOP) (varno:4) (rte_is_new:t)
(parent:5)
              StoRDescriptor: (SD_CHUNKING) (partitions:0)
(fragments:0)
              RTE: (Kind:RTE_JOIN) (jointype:JOIN_INNER) (Rels:)
           [5] (SUBPLAN_ITEM)
              (plan:[1.1.1.2] INDEXSCAN) (varno:5) (rte_is_new:t)
(subplan:4)
              StoRDescriptor: NULL
              RTE: (Kind:RTE_SUBQUERY) (Rels:)
           [6] (RESULT_ITEM)
              (plan:[1] RESULT) (varno:6) (rte_is_new:t)
              StoRDescriptor: (SD_CHUNKING) (partitions:0)
(fragments:0)
              RTE: (Kind:RTE_RESULT) (Rels: 2 5)
=========================================
(51 rows)
```

Shared Aggs

Shared Agg items are created when an agg or an agg sitting on top of one or more of the following plan nodes is encountered:

Unique
Sort
Limit
Group

An agg node combined with zero or more of these plan nodes may form an "agg chain." We will create a shared plan item for the entire agg chain. The output of an agg is a combination of grouping columns (optional—only for grouped aggregates) and agg refs (for grouped and ungrouped aggregates). All input varno and attno references may be changed in the following way:

1. An agg plan item is created.
2. The existing transformations are capped so that they are only effective below the agg chain.
3. All agg refs have a varno of 0. A varno transform is added from 0 to the varno of the newly created agg plan item.
4. For these agg refs, we also are add attno transform to copy the varattno field to varoldattno in the vars.
5. For grouping columns, the old varnos for the input to the agg chain may be pulled and a varno transform for each of these varnos may be created. These varno transforms will be from the oldvarno to the new varno of the shared agg item
6. For all the old varnos of the grouping columns we add attno transforms to copy the varattno field to the varoldattno field.
7. All these transformations mentioned above (varno and attno) will be effective from root of the plan tree till the start of the agg chain.

```
explain select a, count(*) from r1 <slices '3'> group by a;
                                QUERY PLAN
```

-continued

```
    Result (1)   (cost=0.00..2.50 rows=200 width=0)
        ->  HashAggregate (1.1)   (cost=0.00..2.50 rows=200
width=0)
                ->  StoR Scan (1.1.1)   < SLICES '3' >
(cost=0.00..0.00 rows=0 width=0)
                        ->  Stream Scan (1.1.1.1)   on r1
(cost=0.00..31.40 rows=2140 width=4)
    FOLD EXPLAIN:
        INPUT RANGE TABLE:
            (1) RTE: (Kind:RTE_RELATION) (relid:81933) (alias:r1)
(Rels:)
        ATTNO TRANSFORMS:
            [1] (varno:0 oldattno:0 newattno:0)    (stop:1.1)
            [2] (varno:1 oldattno:0 newattno:0)    (stop:1.1)
        VARNO TRANSFORMS:
            [1] (old_varno:1) (new_varno:1)
(start_at_node:1.1.1.1)
            [2] (old_varno:1) (new_varno:2) (start_at_node:1.1)
(stop_at_node:1.1.1.1)
            [3] (old_varno:0) (new_varno:3) (stop_at_node:1.1)
            [4] (old_varno:1) (new_varno:3) (stop_at_node:1.1)
        QUAL ITEMS:
        PLAN ITEMS:
            [1] (SCAN_ITEM)
                (plan:[1.1.1.1] STREAMSCAN) (varno:1)
(rte_is_new:t)
                StoRDescriptor: NULL
                RTE: (Kind:RTE_RELATION) (relid:81933) (alias:r1)
(Rels:)
            [2] (STOR_ITEM)
                (plan:[1.1.1] STORSCAN) (varno:2) (rte_is_new:t)
                StoRDescriptor: (SD_CHUNKING) (partitions:0)
(fragments:0)
                RTE: (Kind:RTE_UNKNOWN) (Rels: 1)
            [3] (AGG_ITEM)
                (plan:[1.1] AGG) (varno:3) (rte_is_new:t)
(stop:[1.1] AGG)
                StoRDescriptor: (SD_CHUNKING) (partitions:0)
(fragments:0)
                RTE: (Kind:RTE_AGGREGATE) (Rels: 2)
            [4] (RESULT_ITEM)
                (plan:[1] RESULT) (varno:4) (rte_is_new:t)
                StoRDescriptor: (SD_CHUNKING) (partitions:0)
(fragments:0)
                RTE: (Kind:RTE_RESULT) (Rels: 3)
=======================================
(35 rows)
```

Shared Result

Shared Result items are created when we encounter either a result node or a result node sitting on top of one or more of the following plan nodes:

Unique
Sort
Limit
Group

A result node combined with zero or more of these plan nodes may comprise an "result chain." We will create a shared plan item for the entire result chain. Result nodes can be either on the top of the query plan, or introduced in the middle of a query block for projection purposes. For a top level result node, we do not need any transformations. But if a result node is not the topmost node of a query block we may do the following:

1. Cap all the existing varno transforms so that they are effective only below the result chain.
2. Pull all the old varnos of the vars from the targetlist of the result node. Add a varno transform for each of these old varnos. The new varno will be the varno of the newly created Result shared planitem.
3. Add an extra varno transform (0-varno-transform) from 0 to the varno of the result shared plan item for any exprs, consts etc.
4. Add attno transforms for the columns since we have mostly done projections in this result node. If the old-attno is non-zero (regular var), then we change it to the position in the targetlist of the join. However, if the oldattno is zero, signifying it is an expression, it will be wrong to add a transform from 0 to the index in the targetlist because there could be more than one expressions and then we would wipe out the effects of all but the last attno transform. Hence, if the oldattno is zero then we copy the varattno to the oldattno field as a part of the attno transform.
5. All these transformations mentioned above (varno and attno) will be effective from root of the plan tree till the start of the result chain.

```
create stream res(a int, b int, t timestamp cqtime user)
type unarchived;
explain select * from res <slices 1 rows> where a = 3 limit
3;
                                    QUERY PLAN
------------------------------------------------------------------------------------
------------------------------
    Result (1)    (cost=0.00..0.00 rows=1 width=0)
        ->  Limit (1.1)   (cost=0.00..0.00 rows=1 width=0)
                ->  Result (1.1.1)   (cost=0.00..0.00 rows=0
width=0)
                        -> StoR Scan (1.1.1.1)    < SLICES 1 ROWS >
(cost=0.00..0.00 rows=0 width=0)
                            Filter: (a = 3)
                            ->  Stream Scan (1.1.1.1.1)   on res
(cost=0.00..32.12 rows=9 width=16)
    FOLD EXPLAIN:
        INPUT RANGE TABLE:
            (1) RTE: (Kind:RTE_RELATION) (relid:81947) (alias:res)
(Rels:)
        ATTNO TRANSFORMS:
            [1] (varno:1 oldattno:1 newattno:1)    (stop:1.1.1)
            [2] (varno:1 oldattno:2 newattno:2)    (stop:1.1.1)
            [3] (varno:1 oldattno:3 newattno:3)    (stop:1.1.1)
        VARNO TRANSFORMS:
            [1] (old_varno:1) (new_varno:1)
(start_at_node:1.1.1.1.1)
            [2] (old_varno:1) (new_varno:2) (start_at_node:1.1.1)
(stop_at_node:1.1.1.1.1)
            [3] (old_varno:1) (new_varno:3) (stop_at_node:1.1.1)
            [4] (old_varno:0) (new_varno:3) (stop_at_node:1.1.1)
        QUAL ITEMS:
            [1] QualItem (plan:1.1.1.1)
        PLAN ITEMS:
            [1] (SCAN_ITEM)
                (plan:[1.1.1.1.1] STREAMSCAN) (varno:1)
(rte_is_new:t)
                StoRDescriptor: NULL
                RTE: (Kind:RTE_RELATION) (relid:81947) (alias:res)
(Rels:)
            [2] (STOR_ITEM)
                (plan:[1.1.1.1] STORSCAN) (varno:2) (rte_is_new:t)
                StoRDescriptor: (SD_CHUNKING) (partitions:0)
(fragments:0)
                RTE: (Kind:RTE_UNKNOWN) (Rels: 1)
            [3] (RESULT_ITEM)
                (plan:[1.1.1] RESULT) (varno:3) (rte_is_new:t)
                StoRDescriptor: (SD_CHUNKING) (partitions:0)
(fragments:0)
                RTE: (Kind:RTE_RESULT) (Rels: 2)
            [4] (RESULT_ITEM)
                (plan:[1] RESULT) (varno:4) (rte_is_new:t)
                StoRDescriptor: (SD_CHUNKING) (partitions:0)
(fragments:0)
                RTE: (Kind:RTE_RESULT) (Rels: 3)
=======================================
(39 rows)
```

Orchestrating Iterator-Model Sub-Plans for Streaming

A technique that permits a quick and easy reuse of RDBMS infrastructure in an SRDBMS is disclosed as follows:

The SRDBMS evaluates standard relational operations (e.g., filters, joins, aggregates, sort) on streaming data using the special CQ operators. Although these CQ operators are conceptually similar to the IMP operators of a traditional RDBMS their underlying interfaces are significantly different. An SRDBMS can achieve streaming versions of standard relational operations by reusing the standard IMP implementation of the underlying RDBMS, and goes beyond just reusing smaller components such as an expression evaluator—the idea is to take full advantage of mature and efficient technology such as outer join implementation.

In essence, a CQ operator focuses on managing streaming data as well as sharing information and orchestrates the underlying IMP sub-plan to achieve the actual relational operations.

The techniques to address the situation posed above as described above may include but is not limited to the following:

- As part of plan folding the input IMP plan is chopped up into various sub-plans, each of which is placed under the control of a specific CQ operator. In a sense, each CQ operator now contains an independent IMP executor.
- A new leaf node, an Adapter, is added to the IMP sub-plan. The Adapter is an iterator-model operator and serves as a way to bridge the CQ operator and the IMP sub-plan. In essence, the Adapter fetches one or more CQ tuples from the controlling CQ operator and delivers it to its parents.
- As a result of plan folding, the expressions evaluated by the operators in the IMP sub-plan can work seamlessly on a composite CQ tuple in most cases. In certain circumstances, however, an IMP operator may access the attributes of an input tuple directly and not through the expression evaluator. In such situations the Adapter projects the composite CQ tuple into a traditional tuple so that it can be evaluated by the IMP sub-plan.
- When the CQ operator is called with a new CQ tuple, it evaluates the appropriate logic (e.g., has a window edge has been triggered) and does one or more of the following depending on the actual operator:
    Buffer the CQ tuple in local state
    Call the next( )method on the root of the IMP sub-plan and deliver one or more tuples through the Adapter

```
Mixed Join
    -> NestedLoop
        -> Adapter
        -> IndexScan
```

Example of CQ Operator Orchestrating IMP Sub-Plan with Buffering

For instance, consider the example of a stream-table "Mixed Join" that is shown above. The heavy lifting of the actual join happens in the Nested Loop operator, but the outer of the Nested Loop is the Adapter which in turn fetches one or more CQ tuples at a time from the Mixed Join operator. In this example the Mixed Join does not need to buffer any input CQ tuple and can instead just call the next( ) method on the Nested Loop operator.

```
Mixed Join
    -> Merge Left Join (cost=299.56..653.73 rows=22898 width=8)
        Merge Cond: (f.b = b.c)
        -> Sort (Sort Key: f.b)
            -> Adapter
        -> Sort (Sort Key: b.c)
            -> Seq Scan on bar b
```

Example of CQ Operator Orchestrating IMP Sub-Plan with Buffering

Suppose, however, the join in question is an outer join. In such a scenario the join operator will be a Merge Join and the inner and outer arms need a Sort as shown above. Since the outer arm has a Sort above an Adapter, in this situation the Mixed Join operator needs to buffer up the CQ tuples that form part of a window before they are consumed by the Adapter.

```
Shared Agg
    -> HashAgg
        -> Adapter
```

Example of CQ Operator Orchestrating IMP Sub-Plan with Accumulation

Advanced Solution Device

This process may be optimized for certain operations that may be found in CQ queries, namely accumulative operations for non-overlapping windows. For instance, consider a situation where we are computing a grouped aggregate over a chunking window on a stream as part of a CQ as shown above. In this situation there is no need to actually buffer up the individual CQ tuples if we can find a way to accumulate the tuples in the underlying HashAgg operator. This optimization can apply to various different IMP operators such as aggregates as well as sort operators and may be accomplished in the following fashion:

- Introduce a new method called accumulate( ) to the standard iterator model interface. The accumulate( )method operates in a fashion similar to next( ). by obeying the following contract:
    Unlike next( ), the accumulate( ) method only fetches a single tuple from its input.
    Like next( ), the accumulate( ) dispatcher checks to see if any parameter of the operator depends on has changed. If so, the dispatcher calls rescan( ) on the operator.
- When the CQ operator receives a new CQ tuple it calls accumulate( ) on the root of its associated IMP sub-plan which in turn fetches the input CQ tuple via the Adapter at the leaf of the IMP sub-plan.
- When a window boundary is triggered the CQ operator repeatedly calls next( ) on the IMP sub-plan in order to produce the results of the operator for the window. If, as in the above example, the IMP operator is a hashed aggregate then as part of calls of next( ) the aggregates are "finalized" for use in result tuples.
- Introduce HARD_RESET and SOFT_RESET, two special built-in parameters that are used by a CQ operator to communicate window boundary events with an IMP operator. In particular, HARD_RESET applies to chunking windows where it indicates that the IMP operator can clean out its state entirely. In contrast, SOFT_RESET is typically used with landmark windows in order to indicate to the IMP operator that its actual underlying internal state (based on user data) should be preserved although the associated controlling data structures (e.g., list/hash-table iterators) can be reset.

The accumulating device described above can also be used for operators such as Sort and Bounded Sort in addition to Aggregates.

Windowing Infrastructure

The following set of techniques may be used to implement various different types of StoRs (StreamToRelation operators or windows) in a unified manner.

The streaming query processing includes an ability to divide the infinite stream of data into "windows" and perform different kinds of operation on them. In an SRDBMS, we achieve this by converting the stream into window sized relations and then performing all other operations on these relations. We call the operators that dissect the stream into windows as StoRs (for Stream to Relation).

A unified windowing infrastructure may solve the following:

Support multiple kinds of windows (chunking, sliding, landmark) whose parameters can in turn be based on different concepts (time, rows, windows).

Eliminate additive latency. When CQs are stacked up in a chain, the prior art implementation results in a latency that is the sum of the advance intervals of each successive query in the chain.

The techniques to address the situation posed above as described above may include but is not limited to the following:

Data and Control Tuples

The raw stream is a sequence of data tuples. The way we choose to implement StoRs is by punctuating the tuples of the raw stream with special control information that will denote the window edges. These tuples are called Control tuples. Therefore, the StoR operators will usually be the first operator that tuples from a raw stream will go to. Once the raw stream has passed through the StoR, it will contain data as well as control tuples. There could be multiple StoRs in a query (if we have a view, a subquery etc.). In such cases, the stream that contains the data and control tuples can pass through one or more StoRs downstream. Therefore, the StoRs are equipped to handle data as well as control tuples in their incoming stream while they inject their control tuples.

Window Edges and their Advance Kinds

Ever window has two edges—the leading edge and the trailing edge. The heart of the operation of a StoR is to detect when an edge is triggered so that it can insert a control tuple signifying the existing of an edge. The advancement of these edges can be based either on time (the non-decreasing value in cqtime column of the stream), or on number of rows, or on the number of windows seen coming from an underlying subquery. We will call these different advance kinds as advance-by-time, advance-by-row and advance-by-windows respectively.

All three types of windows (landmark, chunking and sliding) may have the same mechanism of triggering the leading edge (specified by the 'slices' clause in chunking windows or 'advance' clause in landmark and sliding windows). They will, however, differ a little on when their trailing edges are inserted.

Edge Triggering Logic

The basic edge triggering logic includes comparing the value of an attribute (for advance-by-time it is the cqtime column, for advance-by-rows it is the rowcount, for advance-by-windows it is the window id) of a new incoming tuple with the value of the next edge. All the tuples with the value of the attribute less than or equal to the value of the next edge belong to the window that is being formed. The edge triggering logic differs slightly based on the advance kind of the edge. When we are advancing by time, we use the value of the cqtime attribute of the stream whereas, when advancing by rows we use the rowcount. While any data tuple can have the same value of cqtime as its previous one, it may not have the same rowcount. Therefore, for advance-by-time, we cannot trigger an edge unless we have seen a tuple that has a cqtime that is greater than the value of the next edge. In contrast, when we are advancing by rows, we can trigger an edge when we see a tuple with rowcount that is equal to the next edge of the window. For advance-by-windows, we compare the window id in the control tuple with the value of the next edge. Since two windows may not have the same window id, it is similar to advance-by-rows in that we can close a window in a superquery that is advancing by windows if we see a control tuple from a subquery that denotes a leading edge and that has a window id equal to the next edge of the superquery's StoR.

Following is an exemplary algorithm for triggering an edge:

```
bool edge_triggered(next_edge,
                    input_tuple_attribute,
                    input_tuple_type)
/*
 * the input_tuple_attribute can be cqtime of the input
tuple for
 * advance-by-time or rowcount of the input tuple for
 * advance-by-rows. It will be the window id of incoming
tuple
 * for advance-by-windows.
 */
{
   if (GetAdvanceKind(next_edge) == advance-by-time)
   {
       if (input_tuple_attribute > GetValue(next_edge))
           return true;
   }
   else if (GetAdvanceKind(next_edge) == advance-by-rows)
   {
      Assert(input_tuple_attribute <= GetValue(next_edge));
      if (input_tuple_attribute == GetValue(next_edge))
          return true;
   }
   else /* advance-by-windows */
   {
      Assert(input_tuple_attribute <= GetValue(next_edge));
      if (IsLeadingEdgeControlTupleType(input_tuple_type) &&
          input_tuple_attribute == GetValue(next_edge))
          return true;
   }
   return false;
}
```

StoR Execution Logic for Leading Edge

As mentioned earlier, the execution logic for leading edge may be the same for all the types of windows. When we have advance-by-time, if we get an input tuple that does not trigger the edge, we route it along to the downstream operators. If, however, a tuple comes after some time, it can trigger one or more edges and we send control tuples representing all the intermediate leading edges and then route the tuple to downstream operators. The input tuple is routed after the control tuple(s) because it has a timestamp greater than the window edge that we are closing so it belongs to the next window. For advance-by-rows, if we get an input tuple that does not trigger an edge, we route it along to the downstream operators. If we get a tuple that triggers an edge (we may trigger one edge in advance-by-rows or advance-by-windows), we route the data tuple and then route the control tuple signifying end of the window. This is because the input tuple belongs to the window that we are about to close.

Following is the algorithm for StoR execution of leading edge:

```
void execute_StoR (stor_state,
                   input_tuple)
{
    control_tuple      = NULL;
    input_tuple_type = GetTupleType(input_tuple);
    next_edge          = GetLeadingEdge(stor_state);
    /* Get input_tuple_attribute */
    if (GetAdvanceKind(next_edge) == advance-by-rows)
        input_tuple_attribute = GetRowCount(input_tuple);
    else if (GetAdvanceKind(next_edge) == advance-by-time)
        input_tuple_attribute = GetCqTime(input_tuple);
    else
        input_tuple_attribute = GetWindowId(input_tuple);
    while (edge_triggered (next_edge,
                           input_tuple_attribute,
                           input_tuple_type)
          )
    {
        ContructControlTuple(control_tuple);
        if (GetAdvanceKind(next_edge) == advance-by-time)
        {
            RouteTuple(control_tuple);
            control_tuple = NULL;
        }
        AdvanceEdge(next_edge);
    } /* end of edge_triggered while loop */
    /* Route data tuple */
    if (IsDataTupleType(input_tuple_type))
        RouteTuple(input_tuple);
    /* Route control tuple in case of advance by rows/windows */
    if (control_tuple != NULL)
        RouteTuple(control_tuple);
}
```

StoR Execution Logic for Trailing Edges

The various window types differ in how the trailing edges of their windows are emitted. Following is the execution logic specific to each window type.

Chunking Windows

Chunking windows, by definition are contiguous. Hence, there is no need to explicitly emit a trailing edge, because the leading edge of window can be interpreted as the trailing edge of the next window.

The trailing edge of a chunking window will have the same advance kind as the leading edge.

A data tuple cannot be a part of more than one chunking window.

Landmark Windows

The trailing edge of a landmark window is triggered based on the input tuple's relevant attribute (cqtime for advance-by-time, rowcount for advance-by-rows, and window_id for advance-by-windows) with respect to the next edge calculated by what was specified in the RESET clause.

The trailing edge triggering logic is very similar to the leading edge logic except that it works independently and orthogonal to the leading edge. So, an input tuple can trigger one or both of the edges.

The trailing edge of a landmark window can have an advance kind that is different from its leading edge.

A data tuple may be a part of multiple windows because all windows will have different leading edges but the same trailing edge until a trailing edge (RESET) is triggered.

Sliding Windows

For sliding windows, trailing edges cannot be triggered independently (unlike landmark windows), because the trailing or 'visible' edge of a window is calculated backwards from the leading or 'advance' edge and the advance kind of each edge can be different. Since, trailing edge of a window should precede the leading edge, but we cannot emit a trailing edge till we are about to emit a leading edge, we encode the information about the trailing edge in the control tuple that is emitted for the leading edge. The downstream operators are responsible for buffering the tuples and extracting the embedded information about the trailing edge from the control tuple. This information can be used to discard the buffered tuples that don't belong to the window.

A data tuple can be part of multiple sliding windows.

Depending on the advance kind of the visible clause, we embed the trailing edge information inside the control tuple differently.

If the trailing edge is advance-by-rows then when we emit the control tuple for the leading edge we populate the trailing edge information field with (R−V) where, R is the rowcount of the control tuple for leading edge and V is the number of rows specified in the visible clause.

If the trailing edge is advance-by-time then when we emit the control tuple for the leading edge we populate the trailing edge information field with (T−V) where T is the cqtime of the control tuple for leading edge and V is the time specified in the visible clause.

Solution for the Additive Lag Problem

When we are advancing by time, we cannot trigger a window edge until we have seen a tuple that has a cqtime greater than the next edge value. This can potentially lead to an additive lag in some cases when we have both subqueries and superqueries advance by time.

Example: Let us say that the subquery StoR is slices '3 seconds' and the superquery StoR is slices '5 seconds'. The windows from the subquery will be 3 seconds apart. Let us assume that the rows from the subquery come at times 3, 6, 9 . . . seconds. The superquery will close its first window (next edge being 5) when it sees the first tuple with timestamp 6. Though the subquery finished its 3 second window, the superquery could not close its 5 seconds window because it did not see any tuple with cqtime greater than 5. The superquery had to wait till the subquery was done finishing the 6 second window to close its 5 second window. Thus, we had a lag of 3 seconds. If we have many levels of nesting, this lag could very quickly add up making the streaming applications prohibitively slow.

This problem of additive lag is solved by having speculative time in control tuples.

Speculative Time in Control Tuples

In order to reduce the additive lag described above, we introduced a concept of adding a speculative time in the control tuples for leading edges of advance-by-time windows. When we emit a leading edge, we send a control tuple with cqtime as the window edge time. We also populate an extra field in the control tuple—called the speculative time with the value of the next window edge. By doing this, we are informing the consumer of this control tuple that the next data that comes out of the subquery will have a cqtime of the next window edge. In the above example, the control tuple ending the 3 second window will have a speculative time of 6. When the superquery, sees a control tuple with speculative time of 6 it knows that it cannot see any data that will have a cqtime less than or equal to 5 hence it can close the 5 second window as soon as the subquery's 3 second window has ended.

The edge triggering logic in advance-by-time windows will change slightly. When we are advancing by time, if we get an input tuple that is a control tuple we use the speculative time as the input_tuple_attribute instead of the cqtime of the tuple to check if an edge can be triggered.

a. Visualization Infrastructure

A mechanism that enables users to configure rich and complex dashboards that are driven by the results of continuous queries is disclosed herein.

An SRDBMS can evaluate a CQ over a stream and produce an output stream of data that can be accessed one window at a time through a cursor. The users may be able to construct a dashboard organized with a set of widgets (e.g., line charts, pie charts etc.) that are each driven by one or more CQs, and are continuously updated in real time on an internet client.

There are other aspects that are relevant. Some of these include:
1. The ability for certain visualizations such as line charts to include recent historical data. Therefore, the solution may manage the history, as well as be able to start with recent history "baked in" when a new client signs on.
2. The ability for a visualization to render a restricted subset of the data produced by a CQ, perhaps based on a parameter specified a user.
3. The ability to add customized, user-provided visualization widgets such as a new composite bar-pie chart.

An approach to address the situation described above is to build a web-based application that can be deployed in multiple embodiments such as a thick client, or a plugin that can run in a web browser. In either event, the client/plugin may be capable of evaluating scripting logic, communicating data to and from the server, and have an associated charting library that can be used to render the data. For the remainder of this section we will use the term plugin to refer to either embodiment.

There are two components that are included in the solution: the middle-tier server application and the client that can be downloaded and executed by the plugin. There are two kinds of data that are exchanged between the client and the server:
1. Requests from the client (e.g., subscriptions to a particular data feed)
2. Data corresponding to a given subscription.

We now describe the visualization specification, the server and the client components in more detail.

Visualization Description

The visualization widgets may be specified in XML files that are compiled into scripts that are evaluated in a plugin. A widget specified in this fashion can support different styles of charts (e.g., line, bar, area etc.). In addition, it is possible to create a widget with more than one component. For example, it could contain a quadrant with 4 different charts, or it could contain a side-by-side view of a chart and its corresponding data-table. The XML format for creating new visualizations is broken down into the following three sections:

Parameters—defines any pieces of data that need to be collected from the user
Datasources—identifies the queries that power the visualization
Components—defines the visual elements themselves, such as chart, table, etc The overall structure of a visualization specification may be as follows:

```
<visualization title="my title">
    <parameters>
        <parameter/> (zero or more)
    </parameters>
    <datasources>
        <datasource/> (one or more)
    </datasources>
    <components layout="tab|grid|vertical|horizontal">
```

-continued

```
        <table title="mytitle"> (zero or more)
        <chart title="mytitle"> (zero or more)
    </components>
</visualization>
```

Parameters

The <parameters> element is optional and it can contain 1 or more <parameter> element. Each <parameter> element may be presented to the user as a question/field prior to launching the actual visualization. The parameter element accepts the following attributes:
  name—this is required and refers to the variable-name under which the parameter will be stored
  label—this is optional and will be used as on the screen which is shown to the user. If left empty, the system will use the value of 'name'
  defaultValue—this value is optional and it will be used to populate the initial form when it is presented to the user Example:

```
<parameters>
    <parameter name="history"
        label="Datapoints in chart"
        defaultValue="200"
    <parameter name="title"
        label="Chart title"
        defaultValue="Total Shares Traded"/>
</parameters>
```

Figure 4:
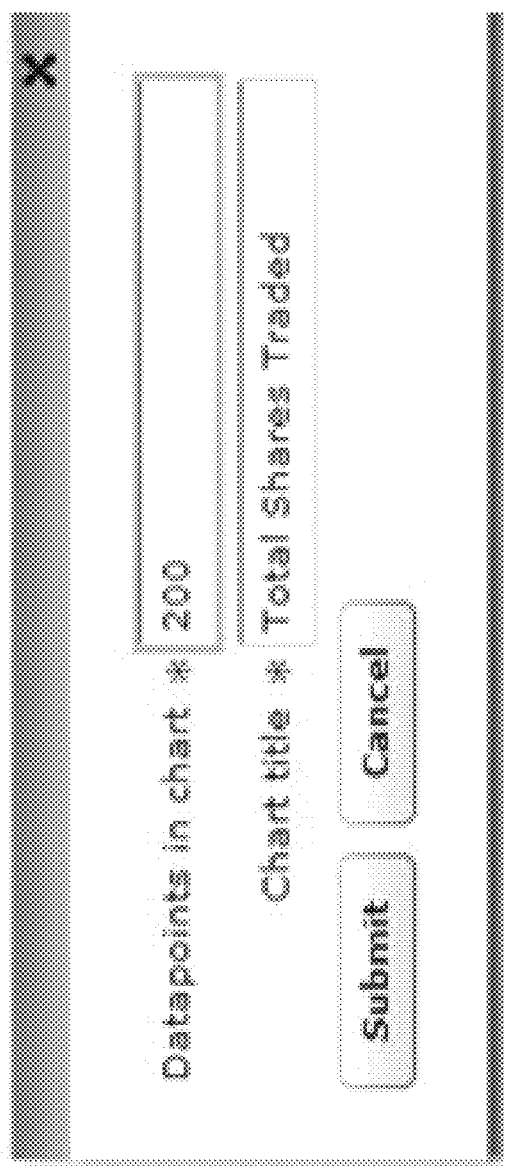
FIG. 4 illustrates a prompt for entering query parameters in a streaming relational database management system.

This would result in the prompt as shown in FIG. 4.

Datasources

The <datasources> element should contain 1 or more <datasource> elements. The datasource element accepts the following attributes:
  dataSourceId—accepts any value unique amongst all the datasources
  queryId—refers to one of the queries that is running on the server
  history—refers to the number of data-elements to retain in memory. When the full history has been reached, the oldest pieces of data may be evicted from memory as new ones are added Example:

```
<datasources>
    <datasource
        dataSourceId="1"
        queryId="TOTAL_SHARES_QUERY"
        history="50">
    </datasource>
    <datasource
        dataSourceId="2"
        queryId="VWAP_QUERY"
        history="50">
    </datasource>
</datasources>
```

Components

The <components> element should contain 1 or child-elements of types: <chart> or <table>.

Chart

The <chart> element can have the following attributes:
  xAxisTitle: label which shows up next to the x-axis. This attribute is optional
  yAxisTitle: label which shows up next to the left-most y-axis. This attribute is optional xAxis2Title: label which shows up next to the right-most y-axis. This attribute is optional xAxisType: can be one of: date, time, category, log and/or numeric. If the attribute is set to category, then two additional attributes are required (categoryDataSourceId and categoryField).

In addition, the chart has a child-element called <series>. The <series> element may contain 1 or more child-elements, each of which may define an individual series of the chart. The series element can be one of: bar, area, line, plot and bubble. Each series element can have the following attributes:

y: defines a column name from the query which will be used for the y-value x: defines a column name from the query which will be used for the x-value dataSourceId: refers to one of the datasources which is defined in the <datasources> section label: Optional attribute which will be used in the tooltip of the chart axis: accepts values 1 or 2. The value 1 is the default value if it is empty. A value of 1 indicates that the series is tied to the left-most y-axis, and a value of 2 indicates that the axis is tied to the right-most y-axis color: hexadecimal value in this format: 0x000000

If the series is of type bubble, the user may also supply a column-name for z (refers to the size of the bubble).

Example:

```
<chart xAxisTitle="Time"
    yAxisTitle="Y1"
    yAxis2Title="Y2"
    xAxisType="datetime|category|log|numeric">
    <series>
        <area
            y="volume"
            x="windowtime"
            label="Volume"
            dataSourceId="1">
        </area>
        <line
            y="price"
            x="windowtime"
            label="Price"
            dataSourceId="1">
        </line>
        <bar
            y="volume"
            x="windowtime"
            label="Volume"
            dataSourceId="1">
        </bar>
        <plot
            y="volume"
            x="windowtime"
            label="Volume"
            dataSourceId="1">
        </plot>
        <bubble
            y="volume"
            z="price"
            x="windowtime"
            label="Volume"
            dataSourceId="1">
        </bubble>
    </series>
</chart>
```

TABLE

Example:

```
<table title="Table" dataSourceId="1">
    <columns>
```

TABLE-continued

Example:

```
        <column name="vwap" label="VWAP"/>
        <column name="windowtime" label="Time"
format="datetime"/>
    </columns>
</table>
```

Server Application

The middle-tier application can be deployed in a generic application server, such as one that supports standard J2EE applications. The application is capable of performing at least the following roles:

Instantiate a CQ in the SRDBMS either on-the-fly or on startup based on a configuration that can be fetched from a standard location such as the file system or a database.

Respond to the following requests from clients:
Fetch the application that can be downloaded and run in the plugin.
Fetching the list of available visualizations from the configuration location.
Fetching a specific named visualization as an XML document.
Establishing a subscription for a CQ.
Backfill a specified amount of recent history of windows for a CQ.
Pushing windows worth of data from CQs to the clients based on the available subscriptions.

Client Application

The client application gets downloaded into the plugin by accessing a designated URL. The application offers a set of "tabs" that provide the following different functionality to the end user:

A report gallery that shows a list of available visualizations and lets users add a visualization on the fly.

A dashboard that contains various activated visualizations.

An admin panel that shows the list of available queries and lets users add a query on the fly.

The general mode of operation is for the client to startup in the "report gallery" tab and for the user to pick a specific visualization widget to be activated and added to the dashboard. When a visualization widget is activated, the client does the following:

Fetch the XML document specifying the visualization from the server.

Parse the document and identify the three major aspects of the visualization: its parameters, its data sources, and its components. As part of this process, the client does the following:

Process the parameters by displaying dialog boxes so that the user can choose the values of the parameters.

Process the data sources and interact with the server to add subscriptions for each query identified by a data source.

Parse the component section, and instantiate a scripting object for each component based on a "factory" of available components. Once instantiated the object is provided the parameters of the visualization as well as the XML fragment that configures it.

At this point control returns to the client which coordinates the work of the various components as well as the interactions with the server. This work is accomplished by handling various events that are raised by the underlying plugin infrastructure. These events are of two types:

User interaction events that are found in standard event-driven UIs. Examples include moving the mouse, clicking on something, navigating to a specific tab, etc.

Data update events that are raised when new data arrives from the server for an active subscription.

For either event, the client identifies the component scripting object that is responsible for handling it, and then dispatches the event to that object. The scripting object is responsible for visually rendering the data communicated to it using the underlying infrastructure provided by the plugin, such as charting.

Advanced Solution Device

In the advanced version of the solution, the following may be accomplished:

Managing History

A chart that needs history (e.g., a line chart) is configured with an extra parameter describing the amount of history in terms of the number of windows that the chart may preserve. In this context an issue to be solved is the initial set of history data to be bound to the chart when it is first activated. This is accomplished by having the client request a backfill of data from the server while activating a chart.

Restricting Data

A visualization widget may render only a subset of the actual data that is produced by a CQ. This may be for two reasons:

1. In order to let a user control how the widget can manipulate a given data set in different ways, possibly controlling how much data is actually rendered in any given configuration. One common use for such functionality is in order to "focus" on a subset of the data that the user has expressed interest in.
2. A given CQ might produce a common set of results that might apply to multiple different visualization widgets. For instance, we might have a CQ that produces summary market information for multiple currency pairs, and the CQ serves as a data source for a visualization widget that is instantiated by different clients and with a different value for a parameter that restricts the data by currency pair. In such a situation it is useful to annotate a subscription on a data source with a restriction that is based on a specific parameter value.

While both of the situations above are similar they are used to accomplish different goals. In the former instance the goal is to fetch a single, possibly large, set of data from the server to the client and then winnow it in several different ways without going back to the server each time. In the latter instance the goal is to repeatedly fetch a limited set of data and avoid including any extraneous data that is known to be unnecessary at the client.

In either instance the idea is to annotate a data source specification with a "filter" in the XML that defines a visualization widget. There is an additional setting for the filter annotation which has two possible choices:

1. Run "on client": This is suitable for the first situation described above where the client restricts the data being rendered but does not affect the actual data fetched from the server.
2. Run "on server": This is suitable for the second situation described above, and requires an extra communication step to the server application which in turn applies the filter for each data tuple produced by the CQ while processing the subscription associated with a given data source.

Extensibility

Extensibility can be accomplished in two ways:

1. Where a user adds a custom component (e.g., a composite bar-pie chart) by adding an associated user-provided scripting object and registering the association of the object to a specific tag in the visualization XML so that the factory can instantiate it.
2. Where a user modifies the functionality of an existing component (e.g., to add annotations to a chart) by implementing a hook that gets invoked by the component factory when activating a component. The hook gets specified in the XML document that describes the visualization widget.

The invention claimed is:

1. A method for managing a data stream, comprising:
receiving a continuous query;
generating an iterator-model plan based on the continuous query;
adding the continuous query to a shared continuous-query plan by:
analyzing the iterator-model plan and generating a plurality of iterator-model subplans by walking the iterator-model plan bottom-up to generate transforms, plan items and qual items based on the iterator-model plan; and
for at least one particular iterator-model subplan of the plurality of iterator-model subplans:
assigning a continuous-query operator to the particular iterator-model subplan; and
adding an adapter as a new leaf node to the particular iterator-model subplan, wherein the adapter is an iterator-model operator configured to fetch one or more processed continuous-query tuples from the continuous-query operator and provide the one or more fetched continuous-query tuples to the particular iterator-model subplan of the adapter;
applying the transforms to convert local range variables of the continuous query to global range variables; and
based on the plan items and the qual items, modifying the shared continuous-query plan, wherein the plan items refer to one or more new or existing continuous-query operator of the shared continuous-query plan, and wherein the qual items comprise information specific to at least one of qualifiers and predicates;
wherein the method is performed by one or more computing devices.

2. The method of claim 1, further comprising:
providing the one or more processed continuous-query tuples to the particular iterator-model subplan.

3. The method of claim 1, wherein the continuous-query operator operates on a stream.

4. The method of claim 1, wherein the shared continuous-query plan comprises a routing table encoding a plurality of routes for tuples in a shared dataflow, wherein adding the continuous query to the shared continuous-query plan further comprises modifying the routing table.

5. A non-transitory computer-readable medium storing instructions which, when processed by one or more processors, cause:
receiving a continuous query;
generating an iterator-model plan based on the continuous query;
adding the continuous query to a shared continuous-query plan by:
analyzing the iterator-model plan and generating a plurality of iterator-model subplans by walking the iterator-model plan bottom-up to generate transforms, plan items and qual items based on the iterator-model plan; and for at least one particular iterator-model subplan of the plurality of iterator-model subplans:

assigning a continuous-query operator to the particular iterator-model subplan; and adding an adapter as a new leaf node to the particular iterator-model subplan, wherein the adapter is an iterator-model operator configured to fetch one or more processed continuous-query tuples from the continuous-query operator and provide the one or more fetched continuous-query tuples to the particular iterator-model subplan of the adapter;

applying the transforms to convert local range variables of the continuous query to global range variables; and based on the plan items and the qual items, modifying the shared continuous-query plan, wherein the plan items refer to one or more new or existing continuous-query operator of the shared continuous-query plan, and wherein the qual items comprise information specific to at least one of qualifiers and predicates.

6. The non-transitory computer-readable medium as recited in claim 5, further comprising providing the one or more processed continuous-query tuples to the particular iterator model subplan.

7. The non-transitory computer-readable medium as recited in claim 5, wherein the continuous-query operator operates on a stream.

8. The non-transitory computer-readable medium as recited in claim 5, wherein the shared continuous-query plan comprises a routing table encoding a plurality of routes for tuples in a shared dataflow, wherein adding the continuous query to the shared continuous-query plan further comprises modifying the routing table.

* * * * *